(12) United States Patent
Shimizu et al.

(10) Patent No.: US 6,183,842 B1
(45) Date of Patent: Feb. 6, 2001

(54) DECORATIVE LAMINATED SHEET

(75) Inventors: Motohiro Shimizu; Yasushi Tokunaga, both of Tokyo (JP)

(73) Assignee: Riken Vinyl Industry Co., Ltd., Tokyo (JP)

( * ) Notice: Under 35 U.S.C. 154(b), the term of this patent shall be extended for 0 days.

(21) Appl. No.: 09/065,234

(22) Filed: Apr. 23, 1998

(30) Foreign Application Priority Data

Apr. 28, 1997 (JP) .................................................... 9-111113
Mar. 9, 1998 (JP) .................................................. 10-056966

(51) Int. Cl.[7] .............................. B32B 3/00; B32B 27/08; B32B 27/36; B41M 3/12; B41M 5/025

(52) U.S. Cl. ......................... 428/141; 428/142; 428/195; 428/321.3; 428/480; 428/483; 428/518; 428/520; 428/913.3; 428/914

(58) Field of Search ..................... 428/480, 483, 428/458, 913.3, 914, 195, 141, 142, 321.3, 518, 520; 156/233, 246, 209, 277

(56) References Cited

U.S. PATENT DOCUMENTS

| | | | | |
|---|---|---|---|---|
| 4,704,325 | * | 11/1987 | Crocker | 428/323 |
| 5,215,826 | | 6/1993 | Shimanski et al. | 428/483 |
| 5,232,764 | * | 8/1993 | Oshima | 428/173 |
| 5,585,177 | * | 12/1996 | Okamura et al. | 428/341 |
| 5,688,581 | * | 11/1997 | Chagnon et al. | 428/195 |
| 5,786,297 | * | 7/1998 | Edwards | 503/227 |
| 5,958,552 | * | 9/1999 | Fukuda et al. | 428/141 |

FOREIGN PATENT DOCUMENTS

| | | |
|---|---|---|
| 4446255 | 6/1996 | (DE) . |
| 0312304 | 4/1989 | (EP) . |
| 9211139 | 7/1992 | (WO) . |

OTHER PUBLICATIONS

Encyclopedia of Polymer Science and Engineering, vol. 3, p. 761, Jan. 1986.*

* cited by examiner

*Primary Examiner*—Paul Thibodeau
*Assistant Examiner*—Ramsey Zacharia
(74) *Attorney, Agent, or Firm*—Sughrue, Mion, Zinn, Macpeak & Seas, PLLC

(57) ABSTRACT

A decorative laminated sheet, sequentially comprising (A) a completely amorphous polyester resin layer and (B) a substrate layer composed of a polyolefin resin, a polyvinyl chloride resin, an acrylonitrile-butadiene-styrene resin, an acrylonitrile-styrene-acrylic acid ester resin, an acrylonitrile-ethylene propylene-styrene resin, a methyl methacrylate-butadiene-styrene resin, a polyethylene terephthalate or a completely amorphous polyester resin. Or a decorative laminated sheet comprising a substrate layer composed of (B) a completely amorphous polyester type resin layer and a transfer foil formed thereon.

11 Claims, No Drawings

DECORATIVE LAMINATED SHEET

BACKGROUND OF THE INVENTION

1. Field of the Invention

The present invention relates to a decorative laminated sheet, particularly to a decorative laminated sheet having excellent moldability, a low temperature impact resistance, surface smoothness, colorless transparency and other various properties; the decorative laminated sheet resists becoming cloudy or opaque when embossing or heat sealing. The decorative laminated sheet of the present invention is particularly suitable for vacuum press molding, pneumatic press molding and membrane press molding.

2. Description of the Related Art

Conventionally, decorative laminated sheets have been widely used or laminated on metallic or wooden materials such as furniture, cabinets, fittings, desks and cupboards. The decorative laminated sheets have been laminated and sealed tightly on adherends having complex contours by the membrane press molding.

For example, Japanese Patent Publication No. 7-39170 discloses a decorative laminated sheet composed of a substrate layer of a polyvinyl chloride sheet and a transfer film laminated thereon using a laminating method of so-called doubling embossing. According to Japanese Patent Publication No. 7-39170, a decorative laminated sheet having stain resistance, scratch resistance and high gloss is provided.

Japanese Patent Laid-Open No. 7-24979 discloses a decorative laminated sheet composed of an opaque polyolefin type resin film and an amorphous polyethylene terephthalate resin film. The amorphous film used for the sheet described in Japanese Patent Laid-Open NO. 7-24979 is partially crystalline. According to Japanese Patent Laid-Open NO. 7-24979 a decorative laminated sheet having excellent moldability, transparency, weather resistance, stain resistance or the like can be obtained.

However, when the above-mentioned decorative laminated sheets are molded by membrane press molding, vacuum press molding, or pneumatic press molding, the sheet may become cloudy or opaque when embossing or heat sealing.

When membrane press molding, a thermoplastic decorative sheet, which is colored or surface-printed with a desired color and a desired thickness, is heated to approximately the softening point thereof, placed on an adherend having a complex contour such as a door of a kitchen unit, covered with, for example, a rubber sheet and then air or liquid pressure is applied to stick the decorative sheet to the contour. Vacuum press molding and pneumatic press molding are based on a same principle of the membrane press molding. The former is a molding method with a vacuum pressure using no membrane rubber, and the latter is a molding method utilizing an air pressure.

The decorative laminated sheet is generally manufactured by a calendar roll method. During the manufacture, irregularities, so-called bank marks, are partially produced caused by a nonuniform flow of a peculiarity of the resin on a calendar sheet. The irregularities do not cause adverse affects on a practical use, however, they affect the smoothness of the surface, resulting in a damaged appearance. In addition, if the line speed is increased when doubling embossing, the bank mark becomes more prominent, thereby reducing productivity.

Moreover, the decorative laminated sheet tends to crack easily at a low temperature. The sheet can crack when handling it in winter.

Furthermore, the sheet composed of the substrate layer of polyvinyl chloride disclosed in the Japanese Patent Publication No. 7-39170 is colored at an early stage, and, due to thermal degradation, is not an especially excellent transparency.

An object of the present invention is to provide a decorative laminated sheet having excellent moldability, a low temperature impact resistance, surface smoothness, colorless transparency and other various properties; the decorative laminated sheet resists becoming cloudy or opaque when embossing or heat sealing, and is particularly suitable for vacuum press molding, pneumatic press molding and membrane press molding.

SUMMARY OF THE INVENTION

Through intense studies of the present inventors, the above-mentioned problems are solved.

The present invention provides a decorative laminated sheet sequentially comprising:

(A) a completely amorphous polyester type resin layer, and (B) a substrate layer composed of a material selected from the group consisting of a polyolefin type resin, a polyvinyl chloride type resin, an acrylonitrile-butadiene-styrene type resin, an acrylonitrile-styrene-crylic acid ester type resin, an acrylonitrile-ethylene propylene-styrene type resin, a methyl methacrylate-butadiene-styrene type resin, a polyethylene terephthalate and a completely amorphous polyester type resin.

According to the decorative laminated sheet of the present invention, the (A) completely amorphous polyester type resin layer is composed of two or more of diol components.

According to the decorative laminated sheet of the present invention, a transfer foil is formed on the (A) completely amorphous polyester type resin layer.

According to the decorative laminated sheet of the present invention, a transfer foil is formed on the (B) substrate layer composed of a completely amorphous polyester type resin.

According to the decorative laminated sheet of the present invention, the transfer foil is formed on the (B) substrate layer composed of the material of the completely amorphous polyester type resin and the completely amorphous polyester type resin is composed of the two or more of diol components.

According to the present invention, a laminated sheet molded by a membrane press molding is composed of the above-mentioned decorative laminated sheet.

DETAILED DESCRIPTION OF THE INVENTION

The present invention will be described below in detail. The (B) substrate layer of the present invention is composed of a material selected from the group consisting of a polyolefin type resin, a polyvinyl chloride type resin, an acrylonitrile-butadiene-styrene type resin, an acrylonitrile-styrene-acrylic acid ester type resin, an acrylonitrile-ethylene propylene-styrene type resin, a methyl methacrylate-butadiene-styrene type resin, a polyethylene terephthalate or a completely amorphous polyester type resin.

Examples of the polyolefin type resin include a polypropylene type resin, a polyethylene type resin, and a copolymer thereof (for example, an ethylene vinyl acetate copolymer). MFR (measurement conditions of polypropylene: JIS K7210, 23° C., 2.16 kgf, measurement conditions of polyethylene: JIS K7210, 190° C., 2.16 kgf) of these resins may be 0.3 to 30 g/10 minutes, preferably 0.3 to 10 g/minutes. In case of using the ethylene vinyl acetate copolymer, the content of ethylene is preferably 70 to 95% by weight, and a saponified substance thereof can also be used. The polyvinyl chloride type resin preferably has a polymerization degree of 400 to 1500, and more preferably 700 to 1300. Copolymers other than the polymer of single polyvinyl chloride resin can also be used therewith.

Plasticizers, stabilizers, lubricants and fillers can be blended in the polyvinyl chloride type resin as required.

Examples of the plasticizer include a phthalic acid ester type compound, an adipic acid ester type compound, a sebacic acid ester type compound, an azelaic acid ester type compound, a trimellitic acid ester type compound, a phosphoric ester type compound, a polyester type compound, an epoxy type compound, a paraffin chloride, an aromatic hydrocarbon type compound, an oil type hydrocarbon compound or the like.

Examples of the stabilizer include a metallic soap (a calcium soap, a barium soap, a zinc soap, a cadmium soap, a lead soap, a lead salt stabilizer), a metallic liquid stabilizer (a metallic salt of branched aliphatic acid (2-ethyl hexoin acid, isodecane acid or the like), unsaturated aliphatic acid (oleic acid, ricinoleic acid, linoleic acid or the like) and aromatic acid (carbolic acid, benzoic acid, salicylic acid and derivatives thereof) with barium, calcium, zinc, tin, magnesium, sodium or potassium), organic tin stabilizer or the like.

Examples of the lubricant include a hydrocarbon type lubricant, a fatty acid type lubricant, an aliphatic alcohol type lubricant, a fatty acid amide type lubricant, a fatty acid ester type lubricant, a fatty acid metallic soap type lubricant or the like.

Examples of the filler include calcium carbonate, aluminum hydroxide, kaolin clay, talc, wollastonite, mica, silica, whisker or the like.

The acrylonitrile butadiene styrene type resin preferably includes butadiene of 50 to 70% by weight, and more preferably 10 to 30% by weight. The weight ratio of styrene:acrylonitrile is 90:10 to 50:50. The weight average molecular weight is preferably 50,000 to 300,000.

The acrylonitrile styrene acrylic acid ester type resin preferably includes an acrylic rubber of 5 to 70% by weight, and more preferably 10 to 30% by weight. The weight ratio of styrene:acrylonitrile is 90:10 to 50:50. The weight average molecular weight is preferably 50,000 to 200,000.

The acrylonitrile ethylene propylene styrene type resin preferably includes ethylene propylene of 5 to 70% by weight, and more preferably 10 to 30% by weight. The weight ratio of styrene:acrylonitrile is 90:10 to 50:50. The weight average molecular weight is preferably 50,000 to 200,000.

The methyl methacrylate-butadiene styrene type resin preferably includes butadiene of 5 to 80% by weight, and more preferably 20 to 70% by weight. The weight ratio of styrene:methyl methacrylate is 30:70 to 70:30.

The polyethylene terephthalate (PET) preferably has an IV value of 0.6 to 0.8. A copolymer of PET can also be used.

According to the present invention, the (A) completely amorphous polyester type resin described below can be used as the (B) substrate layer.

A thickness of the (B) substrate layer may be determined depending on its usage. For example, the thickness is 0.1 to 2 mm, preferably 0.3 to 1.0 mm.

The (A) completely amorphous polyester type resin of the present invention does not recrystallize and does not lower its properties even if it is reheated. The (A) completely amorphous polyeser type resin has no crystalline components. Further, the crystallinity referred to the present invention is a value which is measured in accordance with JIS K7121 (DSC method).

The completely amorphous polyester type resin is preferably manufactured by using mainly, for example, a dicarboxylic acid component such as terephthalic acid or dimethyl terephthalic acid and a diol component such as ethylene glycol to conduct esterification and then polycondensation.

Further, preferably a third component may be copolymerized with the two components used for the above-mentioned completely amorphous polyester to produce a copolymer type completely amorphous polyester type resin,. The third component is preferably 1,4-cyclohexane dimethanol or isophthalic acid. More preferably two or more diol components are used. Most preferably, the dicarboxylic acid is terephthalic acid and the diol components are 50 to 99 mol % of ethyleneglycol and 1 to 50 mol % of 1,4-cyclohexane dimethanol. More particularly, the diol components are 60 to 80 mol % of ethylene glycol and 20 to 40 mol % of 1,4 cyclohexane dimethanol.

The completely amorphous polyester type resin may be manufactured according to methods available in the art, such as, for example, the methods disclosed in U.S. Pat. No. 5,340,907.

According to the present invention, when the completely amorphous polyolefin type resin is selected as the (B) substrate layer, the (A) completely amorphous polyester type resin is preferably the copolymer type including the above-mentioned third component. This combination inhibits the decorative laminated sheet from becoming cloudy or opaque when embossing or heat sealing.

A thickness of the (A) completely amorphous polyester type resin layer is determined depending on its usage. For example, the thickness is 0.1 to 2.0 mm, preferably 0.1 to 1.0 mm.

The (B) substrate layer can be laminated on the (A) completely amorphous polyester type resin by conducting a corona treatment (for example, 20 to 200 $W/m^2$/minute) on the surface of the substrate layer to bond them using typical adhesives, as required.

The corona treatment can be conducted using known corona discharge treatment device utilizing a vacuum tube system, a thyristor system or the like.

According to the present invention, when the (B) substrate layer is printed, the (A) completely amorphous polyester type resin layer does not affect the color on the print, and the color is faithfully maintained, with a deep color.

Further, according to the present invention, a transfer foil can be formed on the (A) completely amorphous polyester type resin layer as required. The transfer foil can include a print layer for a design, a transparent protective film for protecting the print layer, a top coat layer and the like as known in the art. In case of using no transfer foil, embossing is performed on the top of the completely amorphous polyester type resin layer, and ink can be introduced into a concave portion of the emboss. A top coat layer can be further formed thereon using a gravure method.

Alternatively, in case of using the completely amorphous polyester type resin as the (B) substrate layer, the transfer foil can be formed directly on the (B) substrate layer.

According to this embodiment, the decorative laminated sheet has a simple two layer construction even if the transfer foil is laminated. Thus, the decorative laminated sheet can be manufactured advantageously and cost effectively while maintaining the advantages of the present invention.

In this second embodiment, embossing may be performed on the top of the completely amorphous polyester type resin layer, and the top coat layer can be formed directly thereon using a gravure method.

A thickness of whole decorative laminated sheet of the present invention is, for example, 0.15 to 2.0 mm, preferably 0.2 to 1.0 mm, but is not especially limited.

EXAMPLES

The present invention will be further illustrated by the following Examples and Comparative Examples.

Example 1

As the (B) substrate layer, polyvinyl chloride having a thickness of 0.1 mm (manufactured by Riken Vinyl Industry Co., Ltd.; known under the trade name of R type; a polymerization degree of 800; including additives of a plasticizer and a stabilizer) was used. As the (A) completely amorphous polyester type resin layer, amorphous polyethylene terephthalate having a thickness of 0.3 mm (manufactured by Mitsubishi Chemical Co., Ltd.; known under the trade name of Novapex A TEST; a diol component is ethyleneglycol; a dicarboxylic acid component is terephthalic acid; 0% of a crystal component) was used. As the transfer foil, a transfer foil having a thickness of 12 $\mu$m for polyethylene terephthalate (manufactured by Keihan Oike Tensha Co., Ltd. known under the trade name of CL-AP) was used. A decorative laminated sheet was prepared by heat-sealing these materials in the following order of the (B) layer, the (A) layer and the transfer foil using an emboss roll at 150° C. to 160° C. for 40 seconds (under a nip pressure of 2.0 kg/cm).

Comparative Example 1

A decorative laminated sheet was prepared in the same manner as in Example 1 except that polyvinyl chloride layer having a thickness of 0.3 mm (manufactured by Riken Vinyl Industry Co., Ltd.; known under the trade name of S1916 FC039; a polymerization degree of 700; including additives of a plasticizer and a stabilizer) was used in place of the (A) completely amorphous polyester type resin layer and a transfer foil having a thickness of 12 $\mu$m for polyvinyl chloride (manufactured by Keihan Dike Tensha Co., Ltd.; known under the trade name of CL-03B) was used as the transfer foil. The decorative laminated sheets of Example 1 and Comparative Example 1 were measured for a DuPont impact test, surface roughness and transparency. Results are shown in Table 1.

The DuPont impact test was conducted as follows:

After keeping the temperature of the decorative laminated sheets at 23° C., the decorative laminated sheets were placed between a plunger having a peak diameter of ½ inches and a pedestal having a concave portion matched with the diameter and a weight was dropped from a predetermined height to observe presence or absence of crack(s) on a sheet surface.

The height and the weight were changed to determine a maximum value where no crack was produced. An impact value was calculated by the following equation:

Impact value (kg-cm)=load (weight (kg)×height (cm)).

The surface roughness was measured in accordance with JIS B0601. Handy Surf E-30A (trade name) manufactured by Tokyo Seimitsu Co., Ltd. may be used as the equipment for making surface roughness measurements Ra represents center line average roughness and Rz represents ten points average roughness.

The transparency was measured as follows: Chromaticity of a substrate was measured, the decorative laminated sheet of the present invention was sealed on the substrate, chromaticity thereof was measured, and chrominance ΔE was determined by the former chromaticity minus the latter chromaticity. A color difference meter used is CM2002 (trade name) manufactured by Minolta Co., Ltd.

TABLE 1

|  |  | Example 1 | C. Example 1 |
|---|---|---|---|
| DuPont impact test |  |  |  |
| 23° C. | kg · cm | 15 | 15 |
| −20° C. | kg · cm | 15 | 7.5 |
| Surface roughness |  |  |  |
| Ra |  | 0.044 | 0.129 |
| Rz |  | 0.464 | 0.941 |
| Δ E |  | 0.12 | 0.27 |

Table 1 shows that Example 1 has excellent impact resistance, surface roughness and transparency at a low temperature compared to Comparative Example 1.

Example 2

As the (B) substrate layer, polypropylene having a thickness of 0.1 mm (manufactured by Riken Vinyl Industry Co., Ltd.; known under the trade name of #041 OW 9039 type; MER: 6 to 7g/10 minutes) was used. As the (A) completely amorphous polyester type resin layer, amorphous polyethylene terephthalate having a thickness of 0.3 mm (manufactured by Mitsubishi Chemical Co., Ltd.; known under the trade name of Novapex A TEST; a diol component is ethyleneglycol; a dicarboxylic acid component is terephthalic acid; 0% of a crystal component) was used. An adhesive having a thickness of 5 to 6, $\mu$m (a 100:3 (ratio by weight) mixture of a polyester type adhesive, Bylon 63SS manufactured by Toyo Boseki Co., Ltd. and an isocyanate type curing agent Colonate HX manufactured by Nihon polyurethane Co., Ltd.) was applied between the (A) layer and the (B) layer. A decorative laminated sheet was prepared by dry laminating these materials in the following order of the (A) layer, the adhesive and the (B) layer. The decorative laminated sheet was embossed using an emboss roll at 150° C. to 160° C. for 40 seconds (under a nip pressure of 2.0 kg/cm). A corona treatment (for example, 20 to 200 W/m$^2$/minute) was conducted on a rear surface of the (B) substrate layer (opposite side of the (A) layer) to apply a primer layer having a thickness of 2 to 3 $\mu$m (a 100:30 (ratio by weight) mixture of L1135/43 (trade name) manufactured by H.B. Fuller and Colonate HX (trade name) manufactured by Nihon polyurethane Co., Ltd.).

Example 3

A decorative laminated sheet was prepared in the same manner as in Example 2 except that amorphous polyethylene terephtalate having a thickness of 0.3 mm (manufactured by Eastman Chemical Co., Ltd.; known under the trade name of KODAR PETG 6763, a copolymer type; a diol component is 70 mol % of ethyleneglycol and 30 mol % of 1,4- cyclohexane dimethanol; a dicarboxylic acid component is terephthalic acid; 0% of a crystal component) was used as the (A) completely amorphous polyester type resin layer.

Comparative Example 2

A decorative laminated sheet was prepared in the same manner as in Example 2 except that amorphous polyethylene terephtalate having a thickness of 0.3 mm (manufactured by Osaka Jushi Kako Co. , Ltd.; known under the trade name of PET-15, a homo type; a diol component is ethyleneglycol; a dicarboxylic acid component is terephthalic acid; partially including a crystal component) was used in place of the (A) completely amorphous polyester type resin layer.

Comparative Example 3

A decorative laminated sheet was prepared in the same manner as in Example. 2 except that amorphous polyethylene terephtalate having a thickness of 0.3 mm (manufactured by Idemitsu Sekiyu Kagaku Co., Ltd.; known under the trade name of Crystaray; a diol component is ethyleneglycol; a dicarboxylic acid component is terephthalic acid; partially including a crystal component) was used in place of the (A) completely amorphous polyester type resin layer.

The decorative laminated sheets of Examples 2 and 3 and Comparative Examples 2 and 3 were measured for the DuPont impact test, a tensile test, an appearance (visual) after embossing, and a membrane press test. Results are shown in Table 2. Respective test methods are as follows:

Tensile Test

The decorative laminated sheets were measured for tensile yielding load, elongation and tensile breaking load in accordance with JIS K6732.

In Table 2, the decorative laminated sheet before embossing is indicated as "untreated" and the decorative laminated sheet after embossing is indicated as "treated".

Membrane press test

The decorative laminated sheets were disposed at a predetermined portion of a membrane press machine (KT-M-139 manufactured by Benhonor Co., Ltd.) and were sealed at a temperature of 130 to 140° C. for 60 seconds under a pressure of 4 kg/cm² to evaluate their moldability.

An adherend (MDF) is a plywood produced by crushing wooden chips such as conifers, lauan or the like and pressing them. The adherend is cut into a door shape (a size of 400 mm×600 mm, a thickness of about 18 to 40 mm) incorporated into a system kitchen or the like and is curve processed (about 3R to 10R). A decorative groove is carved on a surface of the adherend.

When performing the membrane press molding, a urethane type adhesive having a thickness of 1 to 30 µm (a 100:5 (ratio by weight) of mixture of an adhesive 34333 (trade name) manufactured by Helmitin Co., Ltd. and a curing agent Hardener D (trade name) manufactured by the same company) was applied to a surface of the door-shaped MDF.

TABLE 2

|  |  | Ex. 2 | Ex. 3 | C.E. 2 | C.E. 3 |
|---|---|---|---|---|---|
| DuPont impact test 23° C. | | | | | |
| untreated | kg · cm | 15 | 15 | 22.5 | 15 |
| treated | kg · cm | 20 | 22.5 | 2.8 | 5.3 |

TABLE 2-continued

|  |  | Ex. 2 | Ex. 3 | C.E. 2 | C.E. 3 |
|---|---|---|---|---|---|
| Tensile yielding load | | | | | |
| untreated | kgf | 17.5 | 18 | 21 | 20.3 |
| treated | kgf | 16.4 | 16.4 | 24 | 23.4 |
| Elongation | | | | | |
| untreated | % | 306 | 300 | 206 | 387 |
| treated | % | 331 | 331 | 13 | 163 |
| Tensile breaking load | | | | | |
| untreated | kgf | 18 | 17.5 | 20 | 19 |
| treated | kgf | 19.4 | 18.8 | 20.2 | 21 |
| Appearance after emboss | | *1 | *1 | *2 | *2 |
| Membrane press test (moldability) | | good | good | *3 | *3 |

Note:
Ex. and C.E. mean Example and Comparative Example, respectively.
*1 denotes "no change", *2, significant cloudy or opaque and *3, poor moldability due to insufficient film elongation.

Table 2 shows that Examples 2 and 3 have excellent moldability and do not change to cloudy or opaque after embossing, while Comparative Examples 2 and 3 have poor moldability due to insufficient elongation and do change to cloudy or opaque.

Example 4

As the (B) substrate layer, polypropylene having a thickness of 0.1 mm (manufactured by Riken Vinyl Industry Co., Ltd.; known under the trade name of #041 OW 9039 type; MFR: 6 to 7g/10 minutes) was used. As the (A) completely amorphous polyester type resin layer, amorphous polyethylene terephthalate having a thickness of 0.3 mm (manufactured by Mitsubishi Chemical Co., Ltd.; known under the trade name of Novapex A TEST; a diol component is ethyleneglycol; a dicarboxylic acid component is terephthalic acid; 0% of a crystal component) was used. A resin ink of a urethane type resin (manufactured by Toyo Ink Co., Ltd.; a trade name of Lamister) was applied between the (A) layer and the (B) layer. A decorative laminated sheet was prepared by sealing these materials in the following order of the (A) layer, the resin ink and the (B) layer using a heat-sealing embossing machine at a temperature of 1300C. to 1400C. for 40 seconds under a pressure of 2.0 kg/cm.

Example 5

A decorative laminated sheet was prepared in the same manner as in Example 4 except that amorphous polyethylene terephtalate having a thickness of 0.3 mm (manufactured by Eastman Chemical Co., Ltd.; a trade name of KODAR PETO 6763, a copolymer type; a diol component is 70 mol % of ethyleneglycol and 30 mol % of 1,4-cyclohexane dimethanol; 0% of a crystal component) was used as the (A) completely amorphous polyester type resin Layer.

Comparative Example 4

A decorative laminated sheet was prepared in the same manner as in Example 4 except that amorphous polyethylene terephtalate having a thickness of 0.3 mm (manufactured by Osaka Jushi Kako Co., Ltd.; a trade name of PET-1S, a homo type; a diol component is ethyleneglycol; a dicarboxylic acid component is terephthalic acid; partially including a crystal component) was used in place of the (A) completely amorphous polyester type resin layer and a urethane type resin (manufactured by Toyo Ink Co., Ltd.; a trade name of Lamister) was used as the resin ink.

Comparative Example 5

A decorative laminated sheet was prepared in the same manner as in Example 4 except that amorphous polyethylene terephtalate having a thickness of 0.3 mm (manufactured by Idemitsu Sekiyu Kagaku Co., Ltd.; a trade name of Crystaray; a diol component is ethyleneglycol; a dicarboxylic acid component is terephthalic acid; partially including a crystal component) was used in place of the (A) completely amorphous polyester type resin layer.

Appearances of the decorative laminated sheets of Examples 4 and 5 and Comparative Examples 4 and 5 were evaluated. Results are shown in Table 3. The evaluated method is as follows:

Appearance

Appearances of the decorative laminated sheets after heat-sealing were evaluated visually.

TABLE 3

|  | Ex. 4 | Ex. 5 | C. E. 4 | C. E. 5 |
|---|---|---|---|---|
| Appearance | no cloudy | no cloudy | cloudy | cloudy |

Table 3 shows Examples 4 and 5 have excellent appearance compared to Comparative Examples 4 and 5.

Example 6

As the (B) substrate layer, polyethylene having a thickness of 0.1 mm (manufactured by Riken Vinyl Industry Co., Ltd.; a trade name of #041 OW 9039 type; MFR: 6 to 7 g/10 minutes) was used. As the (A) completely amorphous polyester type resin layer, amorphous polyethylene terephthalate having a thickness of 0.3 mm (manufactured by Mitsubishi Chemical Co., Ltd.; a trade name of Novapex A TEST; a diol component is ethyleneglycol; a dicarboxylic acid component is terephthalic acid; 0% of a crystal component) was used. An adhesive of vinyl chloride—vinyl acetate copolymer type resin (manufactured by the Intec Co., Ltd.; a trade name of ALFA) was applied between the (A) layer and the (B) layer. As the transfer foil, a transfer foil having a thickness of 19 μm for polyethylene terephtalate (manufactured by Keihan Qike Tensha Co., Ltd.; a trade name of CL-AP) was used. A decorative laminated sheet was prepared by heat-sealing these materials in the following order of the (B) layer, the adhesive, the (A) layer and the transfer foil using an emboss roll at 150° C. to 160° C. for 40 seconds (under a nip pressure of 2.0 kg/cm).

Peeling intensity of the decorative laminated sheet was 3.5 kg/inch. A method for measuring the peeling intensity was described below. Pencil hardness under 200 g load was F in accordance with JIS K5400, which is durable in a practical use. No cloudy occurred.

Peeling intensity

After peeling the (B) substrate layer from the (A) completely amorphous polyester resin layer, the (A) and the (B) were secured to a tensile tester with peeling the (A) and the (B) at an angle of 1800 i.e. inversely positioned. A tensile load was measured with peeling the (A) from the (B).

Test condition temperature of 23±2° C., sample strip having a size of 25 mm wide and 150 mm length, a tensile speed of 100 mm/minute.

Example 7

As the e (B) substrate layer, amorphous polyethylene terephtalate having a thickness of 0.3 mm (manufactured by Eastman Chemical Co., Ltd.; a trade name of KODAR PETG 6763, a copolymer type; a diol component is 70 mol % of ethyleneglycol and 30 mol % of 1,4-cyclohexane dimethanol; a dicarboxylic acid component is terephthalic acid; 0% of a crystal component) was used. As the transfer foil, a transfer foil having a thickness of 12 ~i m for polyethylene terephtalate (manufactured by Keihan Dike Tensha Co., Ltd.; a trade name of CL-AP) was used. A decorative laminated sheet was prepared by heat-sealing the (B) layer and the transfer foil using a dielectric roll at 150° C. to 160° C. (under a nip pressure of 2.0 kg/cm, a roll speed of 1 in/minute).

The DuPont impact test and the surface roughness measurement were conducted on the resultant decorative laminated sheet of the present invention. Results are shown in Table 4.

Comparative Example 6

A decorative laminated sheet was prepared in the same manner as in Example 7 except that polyvinyl chloride layer having a thickness of 0.3 mm (manufactured by Riken Vinyl Industry Co., Ltd.; a trade name of S1916 FC039; a polymerization degree of 700; including additives of a plasticizer and a stabilizer) was used in place of the (A) completely amorphous polyester type resin layer and a transfer foil having a thickness of 12 μm for polyvinyl chloride (manufactured by Keihan Oike Tensha Co., Ltd.; a trade name of CL-03B) was used as the transfer foil.

TABLE 4

|  |  | Example 7 | C. Example 6 |
|---|---|---|---|
| DuPont impact test |  |  |  |
| 23° C. | kg · cm | 11 | 11 |
| −20° C. | kg · cm | 11 | 5 |
| Surface roughness |  |  |  |
| Ra |  | 0.040 | 0.135 |
| Rz |  | 0.457 | 0.987 |

According to the present invention, a decorative laminated sheet having excellent moldability, a low temperature impact resistance, surface smoothness, colorless transparency and other various properties is provided; the decorative laminated sheet resists becoming cloudy or opaque when embossing or heat sealing. The decorative laminated sheet of the present invention is particularly suitable for vacuum press molding, pneumatic press molding and membrane press molding.

While the invention has been described in detail and with reference to specific embodiments thereof, it will be apparent to one of ordinary skill in the art that various change and modifications can be made therein without departing from the spirit and scope thereof.

What is claimed is:

1. A decorative laminated sheet sequentially consisting of:
   (A') a transfer foil,
   (A) a completely amorphous polyester resin layer having a thickness of 0.1 to 2.0 mm, and
   (B) a substrate layer composed of a material selected from the group consisting of a polyolefin resin, a polyvinyl chloride resin, an acrylonitrile-butadiene-styrene resin, an acrylonitrile-styrene-acrylic acid ester resin, an acrylonitrile-ethylene propylene-styrene resin, a methyl methacrylate-butadiene-styrene resin, a polyethylene terephthalate, and a completely amorphous polyester resin.

2. The decorative laminated sheet according to claim 1, wherein the (A) completely amorphous polyester resin layer is embossed and has ink introduced into the concave portions of the emboss.

3. A decorative laminated sheet consisting of:
   (B) a substrate layer composed of a completely amorphous polyester resin material and having a thickness of 0.1 to 2.0 mm, and
   (A') a transfer foil on the substrate layer wherein the (B) substrate layer is embossed and has ink introduced into the concave portions of the emboss.

4. A decorative laminated sheet sequentially consisting of:
   (A) a completely amorphous polyester resin layer having a thickness of 0.1 to 2.0 mm,
   (C) a resin ink, and
   (B) a substrate layer composed of a material selected from the group consisting of a polyolefin resin, a polyvinyl chloride resin, an acrylonitrile-butadiene-styrene resin, an acrylonitrile-styrene-acrylic acid ester resin, an acrylonitrile-ethylene propylene-styrene resin, a methyl methacrylate-butadiene-styrene resin, a polyethylene terephthalate, a complete amorphous polyester resin.

5. The decorative laminated sheet according to claim 4, wherein the (A) completely amorphous polyester resin layer is embossed and has ink introduced into the concave portions of the emboss.

6. A decorative laminated sheet sequentially consisting of:
   (A') a transfer foil,
   (A) a completely amorphous polyester resin layer having a thickness of 0.1 to 2.0 mm,
   (C) a resin ink, and
   (B) a substrate layer composed of a material selected from the group consisting of a polyolefin resin, a polyvinyl chloride resin, an acrylonitrile-butadiene-styrene resin, an acrylonitrile-styrene-acrylic acid ester resin, an acrylonitrile-ethylene propylene-styrene resin, a methyl methacrylate-butadiene-styrene resin, a polyethylene terephthalate, a complete amorphous polyester resin.

7. The decorative laminated sheet according to claim 6, wherein the (A) completely amorphous polyester resin layer is embossed and has ink introduced into the concave portions of the emboss.

8. A decorative laminated sheet consisting of:
   (A) a completely amorphous polyester resin layer having a thickness of 0.1 to 2.0 mm which is embossed on its top,
   (D) an adhesive consisting of a mixture of polyester adhesive with a an isocyanate curing agent,
   (B) a substrate layer composed of a material selected from the group consisting of a polyolefin resin, a polyvinyl chloride resin, an acrylonitrile-butadiene-styrene resin, an acrylonitrile-styrene-acrylic acid ester resin, an acrylonitrile-ethylene propylene-styrene resin, a methyl methacrylate-butadiene-styrene resin, a polyethylene terephthalate, a complete amorphous polyester resin, with the side opposite of layer (A) subjected to a corona treatment, and
   (E) a primer layer.

9. The decorative laminated sheet according to claim 8, wherein the (A) completely amorphous polyester resin layer has ink introduced into the concave portions of the emboss.

10. A decorative laminated sheet sequentially consisting of:
    (A') a transfer foil,
    (A) a completely amorphous polyester resin layer having a thickness of 0.1 to 2.0 mm,
    (D) an adhesive consisting of vinyl chloride-vinyl acetate copolymer resin, and
    (B) a substrate layer composed of a material selected from the group consisting of a polyolefin resin, a polyvinyl chloride resin, an acrylonitrile-butadiene-styrene resin, an acrylonitrile-styrene-acrylic acid ester resin, an acrylonitrile-ethylene propylene-styrene resin, a methyl methacrylate-butadiene-styrene resin, a polyethylene terephthalate, a complete amorphous polyester resin.

11. The decorative laminated sheet according to claim 10, wherein the (A) completely amorphous polyester resin layer is embossed and has ink introduced into the concave portions of the emboss.

\* \* \* \* \*